Oct. 7, 1952 E. D. HILBURN 2,613,263

PLURAL CAMERA TELEVISION TRANSMITTER
WITH ELECTRONIC WIPE OUT CONTROL

Filed April 8, 1949 2 SHEETS—SHEET 1

INVENTOR
EARL D. HILBURN
BY Hyman Hurwitz
ATTORNEY

INVENTOR.
EARL D. HILBURN
BY Hyman Hurvitz
ATTORNEY

Patented Oct. 7, 1952 2,613,263

UNITED STATES PATENT OFFICE 2,613,263

PLURAL CAMERA TELEVISION TRANSMITTER WITH ELECTRONIC WIPEOUT CONTROL

Earl D. Hilburn, Silver Spring, Md.

Application April 8, 1949, Serial No. 86,273

7 Claims. (Cl. 178—7.2)

The present invention relates generally to television picture transmission systems, and more particularly to apparatus and methods for varying the composition of transmitted pictures, and for providing novel video effects in accomplishing transition from one scene to another.

In the transmission of pictures by means of television techniques, it is not generally desirable to effect transition from one scene to another in a radical and sudden manner. Techniques have, accordingly, been developed for producing transitions gradually, and in various novel and pleasing ways, many of which have been adapted from motion picture technique.

Various types of transitions of scenes, in the moving picture art, have received names, as for example, fade-out, fade-in, wipe-out, lap dissolve, iris effect, and the like.

A fade-out is the gradual disappearance of a picture from the screen by reduction of its luminous intensity, the terminal result being a completely dark screen.

A fade-in is the gradual appearance of a picture on the screen by increasing its luminous intensity from zero to full or normal brilliance. A fade-in is, therefore, the reverse of a fade-out.

A dissolve is a fade-out followed immediately by a fade-in of a new and different picture on the screen.

When a fade-out and fade-in do not occur separately, or do not follow each other in time, but occur substantially at the same time so that the first picture gradually blends into and becomes the second picture, such a change is commonly called a lap dissolve.

A wipe-out is the passing across the screen of an outline or contour of any desired shape and velocity of motion, outside of which one picture exists, and inside of which a second picture exists. The terms "inside" and "outside" in the preceding statement may be replaced by "right" and "left" or "above" and "below," or by any combination of one or more directions.

If one of the pictures is initiated as a spot on the screen which expands in area, replacing the other picture, until the first picture occupies the entire screen, the effect is often called an "iris" effect. Alternatively, an image may occupy, originally, the entire screen, and may be compressed in area gradually, revealing, as it compresses, the other image outside itself.

It is the purpose of the present invention to provide novel circuits and methods for electrically producing wipe-outs and iris effects in the television art.

It is a further object of the present invention to provide the wipe-out and iris effects solely by means of electrical controls.

It is another object of the invention to produce wipe-outs in television picture transmissions in response to blanking waves applied to the blanking controls of television cameras.

It is still another object of the invention to provide a novel system for generating controlled gating waves for application to television cameras, or for general application in the electronic arts.

The above and still further objects and advantages of the invention will become apparent upon consideration of the following detailed description of a specific embodiment thereof, especially when taken in conjunction with the accompanying drawings, wherein.

Figure 1:
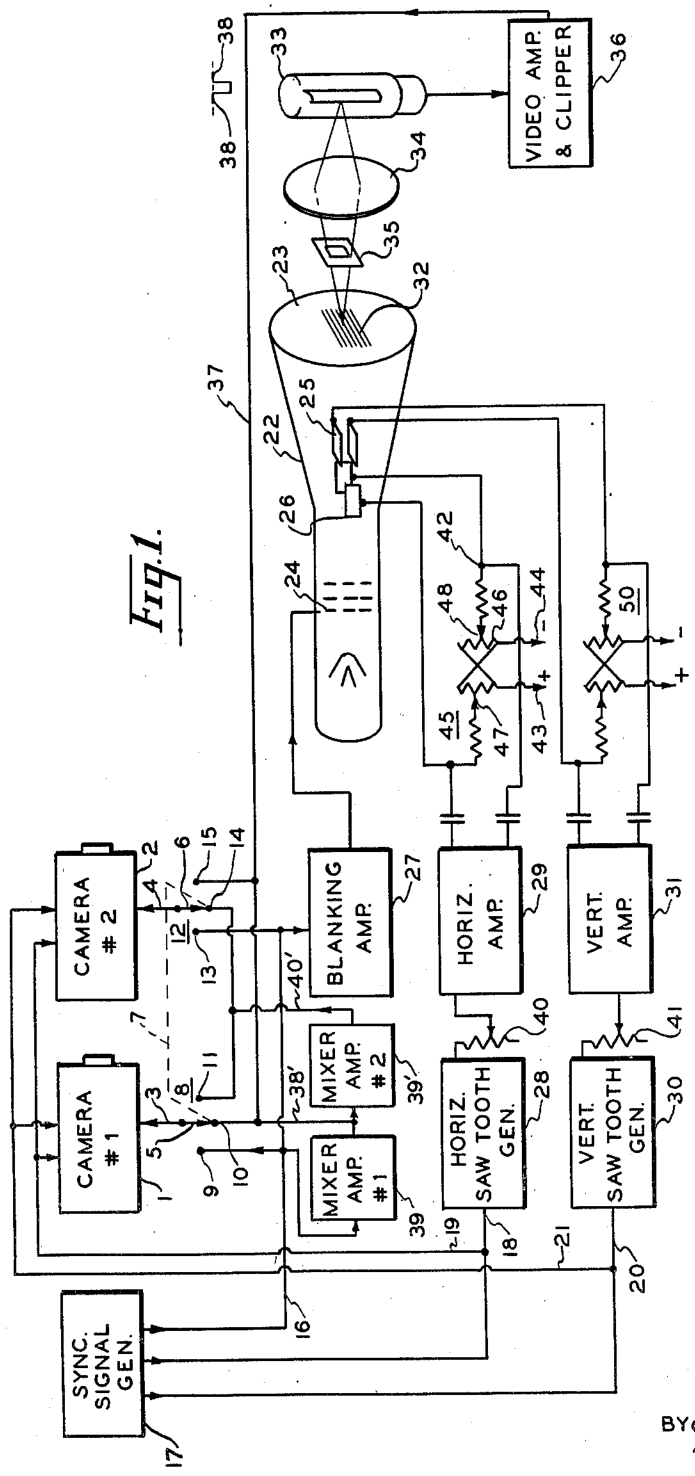
Figure 1 is a schematic circuit diagram of an embodiment of the present invention.

It will be realized that in the television art, fade-ins and fade-outs and lap dissolves may be accomplished very readily by utilization of volume controls supplied for controlling the outputs of television cameras. The problem of producing wipe-outs and iris effects, and the like, however, is a more complex problem involving the timing of the operation of two television cameras. Various solutions to the problem of producing wipeouts and iris effects have been advanced. For example, solutions are provided in U. S. Patent #2,164,297 issued to A. V. Bedford on June 27, 1939, in U. S. Patent #2,172,936 issued to A. N. Goldsmith on September 12, 1939, and the U. S. patent to A. N. Goldsmith #2,193,869 issued on March 19, 1940.

Briefly described, in accordance with the present invention, wipe-out and iris effects are produced by means of flying spot technique, the flying spot being produced by a cathode ray tube in terms of a pattern on the face thereof which duplicates and is synchronized with the scanning pattern applied to the cameras. Light energy from the flying spot is translated into electrical gating waves, which are then applied to the blanking circuits of the cameras. The cameras may be arranged to be normally on, that is, to be normally producing picture signals and are provided with blanking means in the form of cathode ray beam control electrode to which may be applied negative voltages for blanking out the beam, and, accordingly, for preventing generation of picture signals. In the usual operation of such cameras blanking out occurs while the cathode ray beam of the cameras are retracing preparatory to scanning successive lines of the picture, and, further, while the cathode ray beams are retracing preparatory to rescanning a complete frame of the picture. In accordance with the present invention, the gating waves deriving from the flying spot are applied to the cameras for blanking purposes. Means are provided for transferring the gating waves to the cameras in inverse phase, relative to one another, in the sense that if one of the cameras is energized or actuated to produce pictures, which hereinafter will be described by reciting that the camera is "on," rather than "off," the other cameras will be turned "off," the normal blanking period being retained, however, during the gating operation.

One or more masks may be provided, which may be inserted between the flying spot pattern and the photocell for determining the times during which light from the flying spot reaches the photocell, and, accordingly, the times when the gating wave is on and when it is off. Circuits are further provided for shifting the entire flying spot pattern, vertically, horizontally, or in a combination of these directions, and further for varying the size of the flying spot pattern at will. Accordingly, the mask may be retained in a single fixed position and the flying spot pattern shifted with respect to the mask to vary the character of the gating wave. Thereby extreme flexibility of operation is attained, to accomplish wide variety of wipes and iris effects, by providing various combinations of motion of the flying spot scanning pattern with variations of size of the pattern.

It is, accordingly, still a further object of the present invention to produce wipe-out and iris effects in television picture transmission in response to blanking waves generated by a flying spot in a cathode ray tube, the spot following a scan pattern which is normal in television technique, and synchronized with the similar scan pattern provided at the television cameras, the flying spot pattern being movable in any direction and being variable as to size, with respect to a stationary mask.

Referring now more specifically to the drawings, the reference numerals 1 and 2 identify orthicon or iconoscope cameras #1 and #2, respectively, which, during a television transmission may examine different scenes, or different aspects of the same scene. A lead 3 applies to the camera 1 the usual blanking pulses, while a similar lead 4 applies blanking pulses to the camera 2. It will be understood then, that both cameras 1 and 2 normally generate picture signals, so long as no gating wave is applied thereto over the blanking leads 3 and 4, and in the absence of the normal blanking pulses.

Connected to the leads 3 and 4, respectively, are switch arms 5 and 6, which are shown ganged by means of a linkage 7, but which may, if desired, be left unganged to provide greater flexibility of operation. The switch arm 5 is comprised in a switch 8 having three contacts 9, 10 and 11, with which the switch arm 5 may be selectively placed in contact. Similarly the switch arm 6 is part of a switch 12 having three contacts 13, 14 and 15, with which the switch arm 6 may be selectively placed in contact.

A source of blanking pulses may be provided, which is not illustrated, but which provides blanking pulses to a lead 16. These blanking pulses are applied from the lead 16 to the contact 9 of the switch 8 and to the contact 13 of the switch 12. Accordingly, when the switch arms 5 and 6 are in contact with contacts 9 and 13, respectively, the cameras 1 and 2 are provided with normal blanking pulses, which blank out the cathode ray beams of the cameras 1 and 2 between lines and between frames.

Cameras 1 and 2 may, further, be operated in synchronism with suitable signal sources comprised in a sync signal generator 17, horizontal driving pulses being applied via the leads 18 and 19 in parallel to both cameras 1 and 2, and vertical driving pulses being applied via the leads 20 and 21 in parallel to both cameras 1 and 2. The operation of the cameras 1 and 2 in response to the driving pulses provided over the leads 19 and 21, and in response to the blanking pulses provided over the lead 16, is conventional and well understood and need not be described in detail in this specification.

A flying spot generator is provided, in the form of a cathode ray tube 22 and associated cathode ray beam scanning signal sources. The cathode ray tube 22 is provided with the normal complement of control and beam generating electrodes, and may in fact be a relatively conventional cathode ray tube having, however, an extremely fast or short persistence screen. More specifically, the cathode ray tube 22 may be provided with a blanking or beam intensity control electrode 24, and with vertical deflection electrodes 25 and horizontal deflection electrodes 26. The blanking electrode or beam intensity control electrode 24 is coupled via a blanking signal amplifier 27 to the lead 16, and, accordingly, cathode ray tube 22 is blanked whenever cameras 1 and 2 are blanked. Scanning voltages for the cathode ray tube 22 are supplied via a horizontal saw-tooth generator 28, which is synchronized from the lead 18, and via a scanning voltage amplifier 20. Vertical scanning voltages are supplied to the cathode ray tube in the form of saw-tooth signals provided by a vertical saw-tooth generator 30, the output of which is amplified in a vertical saw-tooth wave form amplifier 31, the vertical saw-tooth generator 30 being synchronized via the lead 20. Accordingly, the scan taking place in the cathode ray tube 22 is precisely synchronized with that taking place in the cameras 1 and 2. The pattern 32 traced on the face 23 of the cathode ray tube 22 duplicates that traced by the scanning beams of the cameras 1 and 2, taking the usual form of a series of successively vertically displaced substantially horizontal lines. While the above description, and structure illustrated in the drawings, involve a cathode ray tube having electrostatic deflection electrodes, obviously electro-magnetic deflection may be employed without departing from the true spirit of the invention.

A photocell 33 is provided with its cathode facing scanning pattern 32. A suitable lens 34 may be interposed between the pattern 32 and the photocell 33, to concentrate light from the pattern 32 in the photocell 33. A mask 35 may be interposed between the pattern 32 and the lens 34. Accordingly, light from the pattern 32 reaches the photocell 33 and energizes the latter whenever a line joining each instantaneous component of the trace 32 with the photocell 33 is not blocked by the mask 35.

The output of the photocell 33 is amplified and clipped in a video amplifier and clipper 36, and the output of the amplifier and clipper 36 is applied over a lead 37 directly to the contact 10 of the switch 8, and via a lead 38′ to one stage 39′ a mixing and phase reversing amplifier, the output of which is applied via a lead 40′ to the contact 11 of the switch 8, and to the contact 14 of the switch 12.

The output of the video amplifier 36 constitutes a negative gating pulse, which, when applied to the camera 1 over the lead 37 and via the contact 10 of the switch arm 5, shuts off the scanning beam of the camera 1. This negative gating pulse, after passing through the mixing amplifier 39', is of reverse phase, so that the positive portions thereof, as at 38, become negative gating pulses, which are applied to the contact 11 of the switch 8 and to the contact 14 of the switch 12.

The negative gating pulses supplied by the video amplifier 36 are further applied via the lead 37 to the switch contact 15 of the switch 12, and the output of the mixing amplifier 39' is applied to the switch contact 11 of the switch 8. Accordingly, when the switch arms 5 and 6 contact the switch contacts 10 and 14, respectively, the negative portions of the gating wave supplied by the video amplifier 36' serve to cut off the camera 1 while the positive portions 38 thereof serve to cut off the camera 2. On the other hand, when the switch arms 5 and 6 are in contact with switch contacts 11 and 15, the negative portions of the gating wave serve to cut off the camera 2 while the positive portion serves to cut off the camera 1. While the switch arms 5 and 6 are in contact with switch contacts 9 and 13, on the other hand, the gating waves supplied by the video amplifier 36 have no effect on either of cameras 1 and 2, but the normal blanking pulses supplied over the lead 16 are applied in parallel to the cameras 1 and 2 and the cameras 1 and 2 operate in the normal and usual fashion for such cameras. When the switch arms 5 and 6 are on contact 10, 11 or 14, 15, on the other hand, the cameras 1 and 2 are blanked in alternation, that is, one is blanked while the other is unblanked and the camera which is blanked and that which is unblanked in response to desired portions of gating waves may be selected by properly positioning the switch arms 5 and 6.

The horizontal saw-tooth generator 28 may be provided at its output with a potentiometer 40 to enable application to the input of the horizontal saw-tooth amplifier 29 of a saw-tooth voltage of any desired magnitude. The magnitude of the saw-tooth voltage as applied to the horizontal amplifier 29 in turn determines the horizontal dimension of the pattern 32. By adjusting the output of the horizontal saw-tooth generator 28 by means of the potentiometer 40 to have zero amplitude, the pattern 32 may degenerate into a single vertical line, while by utilizing the full output of the horizontal saw-tooth generator 28 the pattern may be caused to occupy substantially the entire face of the cathode ray tube 22.

A similar potentiometer 41 provided in conjunction with the output circuit of the vertical saw-tooth generator 30, for the same purpose, enables adjustment of the vertical dimension of the pattern 32. The pattern 32, accordingly, may be arranged to have any aspect ratio desired, and not only the normal 4 to 3 aspect ratio utilized in conventional television systems. The pattern may, further, be arranged to have any desired vertical and horizontal dimensions, which are independently adjustable.

At the output of the horizontal amplifier 29 is provided a conventional mixing circuit 42 comprising a positive terminal 43 and a negative terminal 44, a resistance 45 being connected between the positive terminal 43 and the negative terminal 44 and a similar resistance 46 between the negative terminal 44 and the positive terminal 43. The output of the horizontal amplifier 29 is applied to the resistor 45 over a variable tap 47, and the horizontal deflection electrodes 26 connected via variable tap 48 to any selected position in resistor 46.

The full output of the horizontal amplifier 29 is applied to the horizontal deflection electrodes 26 regardless of the position of the contacts 47 and 48 because these horizontal deflection electrodes 26 are, at all times, connected directly to the output leads from the horizontal amplifier 29. On the other hand, one of the deflection electrodes 26 is connected to the variable tap 47 while the other is connected to the variable tap 48, and, accordingly, by varying the variable taps 47 and 48 in respect to their positions along the resistors 45 and 46, the D.-C. potentials applied to the deflection electrodes 26 may be varied over a range of values, and reversed and thereafter again varied over a range of values in reverse sense.

For example, with the contacts 47 and 48 in their lowermost position, one of the deflection electrodes 26 is positive and the other negative, in accordance with the total D.-C. voltage available at the terminals 43 and 44. With the contacts 47 and 48 in their uppermost position, the other of the deflection electrodes 26 becomes positive while the previously positive one becomes negative. For a position of the contacts 47 and 48 mid-way of the resistors 45 and 46, on the other hand, potential on both deflection electrodes 26 is identical. Accordingly, the positions of the contacts 47 and 48 determine the center position of the beam of the cathode ray tube 22, or the position in the absence of saw-tooth deflection voltage, and, accordingly, determine the median position of the pattern 32 horizontally of the face of the indicator 22.

A similar circuit 50 is provided for centering the pattern 32 vertically of the face 23 of the cathode ray tube 22.

Considering now the operation of the present system in producing an iris effect, a mask 35 is utilized, which has a circular opaque portion 51 (see Fig. 2), and which has a transparent portion 52 surrounding the central pattern 51. Assume now that the mask 35 is interposed between the pattern 32 and the photocell 33, and that the total extent of scan both vertical and horizontal is substantially superimposed on the outline of the mask at the limits of the transparent portion thereof. Referring more specifically to Figure 3 of the drawings the relative position of normal blanking pulses provided over the line 16 are illustrated. These blanking pulses occur at the same position for various vertical positions of the scanning pattern, as for example, along line $x$, line $y$ and line $z$. For the line $x$, however, light reaches the photocell 33 only while the beam of the cathode ray tube 22 is traversing the transparent portion 52 of the mask 35. Accordingly, we see at line B of Figure 3 a negative pulse 53$a$ which is caused by passage of the cathode ray beam across the central pattern on the level of the line $x$. Passing to the line $y$, the central pattern is wider and the gating wave 53$b$ accordingly becomes longer. At the line $z$ the total scan during which light passes to the photocell 33 is at its minimum since the line $z$ is drawn diametrically across the central pattern 51, and, accordingly, the scanning wave 53$c$ has attained a maximum value.

Portions 54 of the wave form containing the wave 53$c$ correspond in relative length to the transparent portion of the mask 35 at the line $z$. The wave forms shown at line B of Figure 3 may be applied over the line 37 to camera number 1, if the switch arm 5 is in contact with the switch contact 10, and in such case this blanking wave is not applied to camera number 2, but is applied to the mixing amplifier 39′, which acts to reverse the phase of the blanking wave and to apply to the contact 14 of switch 12, which is now connected to camera number 2, a blanking wave of the character illustrated in line C of Figure 3 of the drawings. It will be evident that the negative gating wave, shown in line B as applied to camera number 1, will eliminate picture signal transmission during the time that the gating wave is more negative than the zero axis, and will permit generation of signal pictures at all other times. Similarly, the gating wave applied to camera 2 will disable picture transmission while the gating wave shown in line C is negative with respect to the zero axis, and will permit picture signal transmissions at all other times. It will be clear from the diagram that the times of picture signal transmission are complementary, that is, that one camera is on while the other camera is off during each line of scan.

Accordingly, cameras 1 and 2 transmit in alternation during each horizontal trace of the cathode ray beams thereof, the first camera transmitting while the beam of the cathode ray beam 22 is aligned with the transparent portion 52 of the mask 35, and the second camera transmitting while the cathode ray tube 22 is aligned with a central pattern 51 of the mask 35.

The size of the pattern 32 may be reduced by controlling the potentiometers 40 and 41. If the entire scan pattern 32 is aligned with the central pattern 51 of the mask only the camera 2 will transmit, the camera 1 being completely inactive. As the potentiometers 40 and 41 are varied in respect to position, the pattern 32 may be gradually expanded in size so that eventually substantially the entire pattern is aligned with the transparent portions of the mask 35, the central pattern 51 corresponding with a substantially small portion of the scan pattern 32. When this condition has been reached, the camera 1 will be transmitting substantially all time, and the camera 2 will be substantially inactive. Transmission may thereby be transferred from one camera to the other in terms of an iris effect.

Similarly for wipe-outs, a mask may be provided which covers a portion of the pattern 32 for one size and position thereof. If we assume that half the pattern is covered along a vertical line thereof, for example, cameras 1 and 2 will transmit in alternation along each horizontal line of scan, if the mask covers a portion of the pattern 32. Variation of the transmission times as between cameras 1 and 2 may be accomplished readily by varying the position of the pattern 32 horizontally, vertically, or simultaneously horizontally or vertically, as desired, by controlling the centering circuits 42 and 50, or alternately by controlling size of the pattern 32 by means of the controls 40 and 41.

Figure 4:
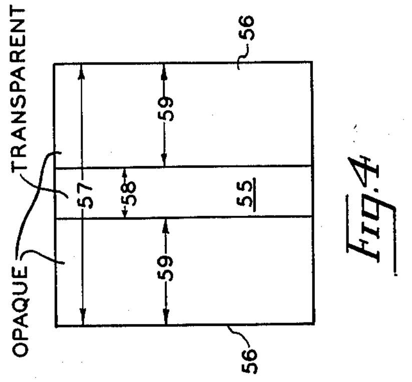
Figures 4, 5 and 6 illustrate further masks utilizable in the system of Figure 1.

To provide a specific example, I may use a mask as illustrated in Figure 4 of the drawings, having a rectangular transparent portion 55 and two opaque portions 56, which bound two vertical edges of the transparent portions 55. Horizontal scan may take place over a range corresponding with the line 57. Accordingly, one camera will be on during the time corresponding with scan over the line 58, while the other camera will be on for times corresponding with the line length and position of the line 59. By varying the horizontal dimensions of the pattern 32 and its position, then, the entire pattern may be caused to fall within the transparent portion 58, or the pattern may be expanded horizontally until the major portion thereof falls on the opaque portion of the mask, providing an extremely novel wipe-out. The rate at which the wipe-out may be caused to occur similarly may be readily controlled in terms of the rate of variation of the centering circuits 42, or of the amplitudes of the saw-tooth scanning voltage as controlled by the potentiometer 40.

Figure 5:
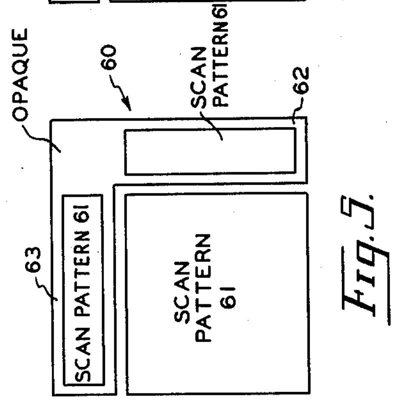

A further novel type of wipe-out may be generated by means of a mask of the character illustrated in Figure 5 of the drawings, wherein an L shaped mask is provided. The scan may be caused to occupy the transparent portion of the mask 60, as at 61. The pattern 61 may be gradually fed to the right until it is partially masked by the L-shaped portion 62 and then gradually reduced in width until it is completely masked by the opaque portion 62 of the mask 60. Alternatively, the pattern 61 may be fed vertically until it is hidden by the horizontal leg 63 of the mask 60, being first shifted vertically upward and then made smaller in size, to this end.

Figure 6:
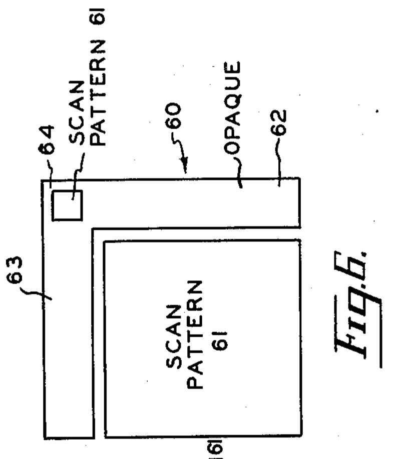

As a further modification, illustrated in Figure 6 of the drawings, the pattern 61 may be fed simultaneously vertically and horizontally, and reduced in size, until eventually it is behind the opaque portion at the corner 64 of the pattern 60.

Obviously, any combination of the motions described may be utilized, to provide a practically inexhaustible variety of wipe-outs.

Figure 2:
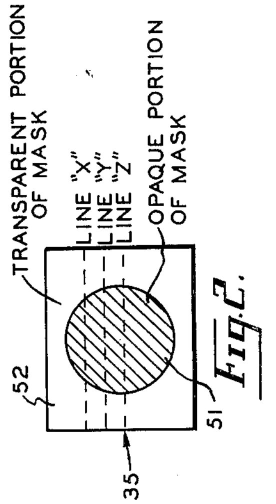
Figure 2 is a diagram of a mask used in the system of Figure 1 for producing iris effect.
Figure 3:
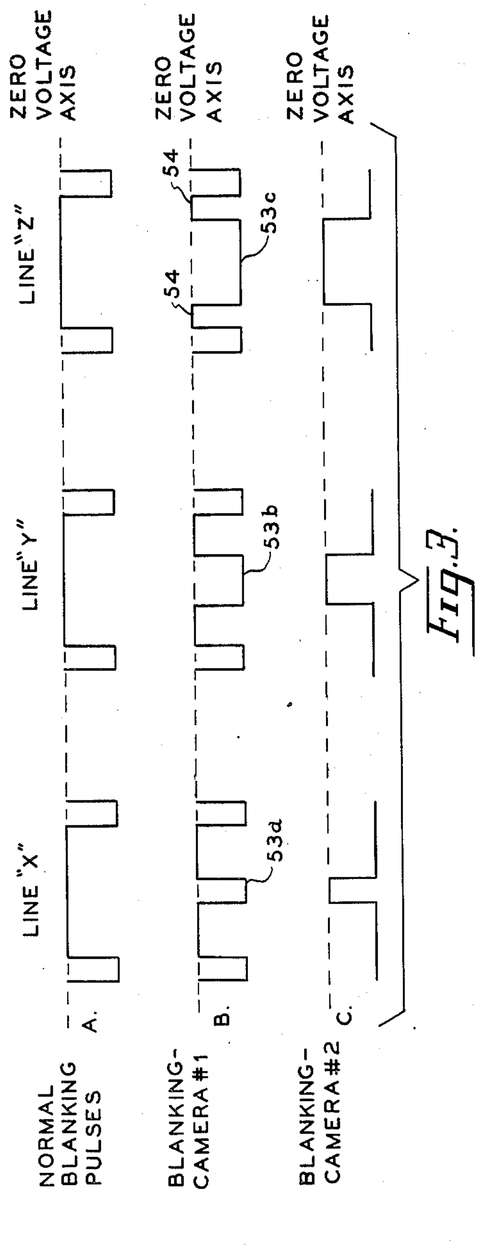
Figure 3 is a wave form diagram pertaining to the system of Figure 1.

Considering again the iris effect mask which is illustrated in Figure 2 of the drawings, it will be clear that modified iris effects may be produced by varying the aspect ratio of the pattern 32 prior to expansion or contraction of the overall area of the pattern 32 to produce the iris effect, and that so varying the aspect ratio of the pattern 32 has a similar effect to that which would be provided by varying the shape of the iris. In this manner, various elliptical or non-circular iris effects may be produced. Still further iris effects may be accomplished by utilizing square shaped, diamond shaped, key hole shaped, apertures, and the like.

It is of importance to note that the present system employs fixed masks, and a moving scanning pattern which is movable either vertically or horizontally, or both vertically and horizontally simultaneously, and is variable in respect to overall area. This possesses the advantage of greatly simplifying the mechanical and optical features of systems of the character disclosed for producing novel effects.

No complications will be encountered due to changing screen brightness, in the present system, as the size of the scan pattern varies, since I provide in the amplifier 36 a clipping circuit or limiting circuit, which assures that the output wave forms are of uniform amplitude for all conditions and adjustments of the pattern 32. Further, de-focusing and spot size changes associated with variations by size of the pattern 32 are of no practical importance, since imperfectly defined edges between two scenes on the same screen may be tolerated while they are in process of change, or for short periods of time.

Further, control of special effects in television picture transmission is obtained, by the present system, utilizing existing camera blanking system, and thereby minimizing transient effects which would occur were blanking to occur in the video switching and distribution system or in the video amplifiers of the television transmitter.

The system further is extremely simple, since it involves only sufficient equipment for modifying and controlling the existing blanking waves.

The system, furthermore, is extremely flexible in its applications, since it may be added to any existing camera system whether of the iconoscope or the orthicon type, and without regard to variations in design of the camera system, or its associated electrical equipment. It is necessary merely to apply the gating waves to the blanking leads of the cameras, and all cameras presently known to me are provided with such blanking leads. Since control is effected in the blanking circuits of the cameras any fading or switching equipment which is available at the cameras, or at the video amplifiers associated therewith, are not affected by the presence or absence of the present system, and may be operated as if it were not being utilized.

The question of blanking the cameras 1 and 2, or of combining the gating wave supplied by the video amplifier and clipper 36 with the normal blanking impulses supplied over lead 40 to assure picture gating without destroying normal blanking is accomplished as follows, reference being made to Figure 3 of the accompanying drawings.

When the switch arms 5 and 6 are in contact with contacts 9 and 13, normal blanking pulses are simultaneously applied to both camera 1 and camera 2. These blanking pulses are illustrated at line A of Figure 3. For this position of the switch arms 5 and 6, no output from the video amplifier and clipper 36 is made available to cameras 1 and 2, and, accordingly, no gating occurs.

Assume now that the switch arms 5 and 6 have been moved into contact with contacts 10 and 14, respectively, of switches 8 and 12, respectively. Negative gating waves are now applied to camera 1 directly from video amplifier and clipper 36. At the same time negative blanking pulses are applied to camera #1 directly from video amplifier and clipper 36, these being generated by the flying spot in generating pattern 32, by virtue of the blanking of the latter at the end of each line trace, by blanking amplifier 27. Accordingly, the wave pattern applied to camera #1 corresponds with that illustrated at line B of Figure 3.

Camera #2 at this time receives negative gating pulses over line 40' from mixer amplifiers 39 and 39'. Since the mixer amplifier 39 introduces a polarity reversal into blanking pulses applied thereto, and since the mixer amplifier 39' introduces a further polarity reversal, the gating waves applied to the line 40' are of negative polarity and are suitable for blanking camera #2. The gating wave applied to camera #2, on the other hand, arrives from video amplifier and clipper 36 via only one stage 39', and has, therefore, suffered a phase reversal, or is positive as illustrated at line C of Figure 3, while the gating wave 53a, b and c are negative, relatively. Accordingly, the total blanking pattern applied to camera #2 is that illustrated at line C of Figure 3.

When switch arms 5 and 6 are transferred to contact 11 and 15, respectively, of switches 8 and 12, respectively, the gating wave from video amplifier and clipper 36 are applied directly to camera #2 and are applied via phase reversing mixing amplifier 39' to camera #1. Hence, scanning of an opaque portion in the mask 35 now results in blanking at camera #2 and picture production at camera #1. At the same time, normal blanking pulses are provided for camera #2 by scanning the scanning pattern 32 at the end of the scanned line and blanking pulses for camera #1 are supplied via mixer amplifiers 39 and 39' in cascade, so that these are negative as applied to camera #1. Accordingly, the total gating wave pattern as applied to cameras #1 and #2 interchange as seen in Figure 3 of the drawings, the wave pattern there shown as applicable to camera #1 being that applied to camera #2 and the wave pattern there shown as applicable to camera #2 being that applied to camera #1.

While I have disclosed a system wherein a scanning pattern 32 is produced on a fluorescent screen, and signals derived from the illumination by means of a photo-electric cell, it will be clear that the basic concept of the invention is of wider application than is envisaged in the specific embodiment of the invention, and particularly that in place of a fluorescent screen and a photocell I may utilize a collector electrode located internally of the cathode ray tube 22, blanking and unblanking waves being selectively generated in response to scanning of the beam of the cathode ray tube over a portion of the area of the electrode, and over an area not occupied by the electrode.

Alternatively, the electrode may be located externally of the cathode ray tube, and particularly on or adjacent to the face thereof, and may be coupled to the electron beam electro-statically through the envelope of the cathode ray tube 22. While the variations of the specific embodiment illustrated and described are feasible, it is believed that they are not commercially practical, since they are relatively inflexible as compared with the system illustrated and described, since the latter may make use of the wider variety of different masks which may be very readily replaced or inter-changed.

While I have illustrated the mask 35 as invariably positioned, it will be realized that further novel effects may be accomplished by slow rotation of the mask 35, in conjunction with manipulation of the various controls which determine the size and position of the scanning pattern 32. Similarly, the scanning pattern 32 itself may be rotated, if desired to accomplish the same results, and this may be accomplished either mechanically or electrically, in accordance with known techniques.

While I have described one specific embodiment of the present system it will be clear that variations of the system, especially in respect to details of construction and circuit arrangement, may be resorted to without departing from the true spirit and scope of the invention.

What I claim and desire to secure by Letters Patent of the United States is:

1. A wipe-out control system for television comprising separate means for simultaneously and synchronously scanning two object areas and a portion of a control area to produce independent series of signals, said control area comprising high and low light transferring portions, means for suppressing the signals from one of the object areas when the high light transferring portion of the control area is being scanned, means for suppressing the signals from the other object area when the low light transferring portion of the control area is being scanned, means for combining the unsuppressed signals, and means comprising potentiometers for controlling the size and the position of said portion of said control area with respect to said control area.

2. The system of producing wipe-out effects in television image signals which comprises, means for independently and separately scanning a first object area, a second object area, and a predetermined portion of a control area, in synchronism, to produce from each scanning a series of signals, means for utilizing the signals deriving from said predetermined portion of said control area to suppress selectively and alternately the signals deriving from the object areas, and means for continuously varying the size and the dimensions of said predetermined portion of said control area by selectively varying a plurality of control voltages.

3. A picture transmitting system comprising first means for producing electrical signals representative of a first scene, said first means comprising a first television camera having a first picture scanning cathode ray tube, said cathode ray tube having a first blanking control circuit including an intensity control electrode, and means for applying blanking waves to said blanking control circuit, second means for producing electrical signals representative of a second scene, said second means comprising a second television camera having a second picture scanning cathode ray tube, said cathode ray tube having a blanking control circuit including an intensity control electrode, each of said cathode ray tubes further comprising means for generating a beam of electrons, means for scanning said beams of electrons horizontally and vertically in synchronism to scan a picture area, means for generating first and second blanking waves in synchronism with said scanning, said last means comprising a flying light spot scanner having means for moving a light spot in synchronism with said beams of electrons and in a predetermined pattern, and means for varying the size and position of said pattern at will, said first and second blanking waves occurring in time succession and having a sum of durations equal to and substantially coincident with each horizontal scan of said beams of electrons, means for applying one of said blanking waves to one of said blanking control circuits and means for applying the other of said blanking waves to the other of said blanking control circuits.

4. The combination in accordance with claim 3 wherein said means for generating said first and second blanking waves comprises means for generating a third beam of electrons, means for scanning said third beam of electrons horizontally and vertically to scan an area in synchronism with said first mentioned scanning, a fluorescent surface in the path of said third beam of electrons, whereby said scanning of said third beam of electrons generates an illuminated pattern on said fluorescent surface, a photoelectric cell positioned to receive illumination from said illuminated surface, and arranged to generate signals in response to said illumination, and means responsive to said signals for generating said blanking waves.

5. The combination in accordance with claim 4 wherein is provided a mask having opaque and transparent portions, interposed between said illuminated pattern and said photo-electric cell, and means for varying the position and the size of said illuminated pattern on said fluorescent surface to vary the character of said gating waves.

6. A system for producing novel visual effects in television, comprising, a first television camera for scanning a first object area, said television camera comprising a cathode ray tube having a blanking grid, a second television camera for scanning a second object area in synchronism with said first object area, said second television camera comprising a cathode ray tube having a blanking grid, means for generating a scanning raster for scanning a control area having two sub-areas of mutually different characteristics in synchronism with scanning of said first and second object areas by said first and second cameras, means responsive to said last means for generating blanking voltage only when scanning one of said sub-areas, means for applying said blanking voltage to one only of said blanking grids, means for varying at will the location and size of scanning raster, wherein said means for generating a scanning raster comprises a cathode ray tube having a fluorescent surface, means for generating an electron beam, and means for controllably directing said electron beam against said fluorescent surface in a pattern corresponding with said scanning raster.

7. A system for producing novel visual effects in television, comprising, a single source of synchronizing and negative blanking pulses, a first television camera responsive to said synchronizing and blanking pulses for scanning an area, a second television camera responsive to said synchronizing and blanking pulses for scanning an area, a cathode ray tube control device responsive to said synchronising and blanking pulses for scanning a control area having at least two sub-areas of selectively light responsive and non-responsive characteristics, and for producing gating waves in response to scanning said non-light responsive sub-area and in response to said blanking pulses, a first and a second phase reversing and mixer amplifier connected in cascade, means for applying said synchronizing and blanking pulses to said first amplifier, means for applying said gating waves to said second amplifier, means for selectively connecting said single source of synchronizing and negative blanking pulses directly to said first and second television cameras, means for at will applying said gating waves directly to one of said cameras and via said second amplifier to the other of said cameras, and means for applying said gating waves directly to the other of said cameras and the output of said second amplifier to said one camera, to effect selective blanking of said cameras.

EARL D. HILBURN.

REFERENCES CITED

The following references are of record in the file of this patent:

UNITED STATES PATENTS

| Number | Name | Date |
|---|---|---|
| 2,164,297 | Bedford | June 27, 1939 |
| 2,168,566 | Goldsmith | Aug. 8, 1939 |
| 2,172,936 | Goldsmith | Sept. 12, 1939 |
| 2,193,869 | Goldsmith | Mar. 19, 1940 |
| 2,251,525 | Rosenthal | Aug. 5, 1941 |
| 2,429,921 | Brady | Oct. 28, 1947 |
| 2,476,698 | Clapp | July 19, 1949 |

FOREIGN PATENTS

| Number | Country | Date |
|---|---|---|
| 529,985 | Great Britain | Dec. 3, 1940 |